US 7,053,567 B2

(12) United States Patent
Yamamoto (10) Patent No.: US 7,053,567 B2
(45) Date of Patent: May 30, 2006

(54) POWER TOOLS

(75) Inventor: Hirokatsu Yamamoto, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/386,876

(22) Filed: Mar. 12, 2003

(65) Prior Publication Data

US 2003/0174449 A1    Sep. 18, 2003

(30) Foreign Application Priority Data

Mar. 15, 2002    (JP) .............................. 2002-072890

(51) Int. Cl.
    *H02P 5/00*    (2006.01)
(52) U.S. Cl. ...................... 318/139; 318/432; 318/434; 173/178; 173/181; 173/217
(58) Field of Classification Search ................ 318/139, 318/430–434, 138, 254; 173/178, 181, 217
    See application file for complete search history.

(56) References Cited

U.S. PATENT DOCUMENTS

| 5,277,261 | A  | * | 1/1994  | Sakoh .......................... 173/176 |
| 5,738,177 | A  | * | 4/1998  | Schell et al. ................. 173/178 |
| 5,918,685 | A  | * | 7/1999  | Ulbrich et al. .................. 173/4 |
| 6,460,626 | B1 | * | 10/2002 | Carrier ............................ 173/1 |
| 6,488,195 | B1 | * | 12/2002 | White et al. ................. 227/130 |
| 6,503,949 | B1 | * | 1/2003  | Lau et al. ..................... 514/617 |
| 6,536,536 | B1 | * | 3/2003  | Gass et al. ....................... 173/2 |
| 6,607,041 | B1 | * | 8/2003  | Suzuki et al. ................... 173/4 |
| 6,675,912 | B1 | * | 1/2004  | Carrier ......................... 173/217 |
| 6,729,413 | B1 | * | 5/2004  | Turner et al. ................ 173/217 |
| 6,729,415 | B1 | * | 5/2004  | Huang .......................... 173/217 |
| 6,834,730 | B1 | * | 12/2004 | Gass et al. ....................... 173/2 |
| 6,913,087 | B1 | * | 7/2005  | Brotto et al. ................... 173/1 |
| 6,933,689 | B1 | * | 8/2005  | Yamamoto .................. 318/139 |

FOREIGN PATENT DOCUMENTS

| JP | 07-139522 | 12/1996 |
| JP | 07-173549 | 1/1997 |

* cited by examiner

*Primary Examiner*—David Martin
*Assistant Examiner*—Tyrone Smith
(74) *Attorney, Agent, or Firm*—Orrick, Herrington & Sutcliffe LLP (57) ABSTRACT

It is an object of the invention to provide a technique to effectively prevent a power tool from being adversely affected when a battery is removed from the power tool. According to the present invention, a power tool is provided that includes a tool bit, a motor that drives the tool bit, a body that houses the motor, a battery detachably coupled to the body so as to supply driving current to operate the motor, a control device that controls the operation of the motor and a power circuit that leads the driving current from the battery to the motor. Within the power tool, the control device stops the motor prior to an interruption of the power circuit when the battery is disengaged from the body in order to prevent a large driving current from being passed through the power circuit. As a result, arc can be effectively prevented from being generated between the battery and the body of the power tool.

19 Claims, 12 Drawing Sheets

POWER TOOLS

BACKGROUND OF THE INVENTION

1. Field of the Invention

The present invention relates to a power tool driven by a battery and, more particularly, to a power tool that can prevent an arc between the body of the power tool and the battery when the battery mounted is detached from the body during operation.

2. Description of the Related Art

According to a known power tool driven by a battery, the battery supplies driving current to a motor in order to drive a tool bit. For example, a known screwdriver includes a body having a motor housing and a hand grip, and a battery detachably coupled to the body. The motor housing includes the motor for driving the driver bit. The hand grip is connected to the motor housing. The battery is detachably coupled to the lower end portion of the hand grip. The battery is defined as one element of a power circuit to drive the motor by means of a connecting terminal. Thus, the battery supplies driving current to the motor via the power circuit.

Within the known power tool, because the battery is detachably coupled to the body, user of the power tool may unintentionally remove the battery from the body during the operation. Because the battery defines one element of the motor driving power circuit via a connecting terminal and the battery supplies driving current to the motor during its operation. Therefore, when the battery is removed from the body during the operation of the power tool, the power circuit may possibly be interrupted abruptly. When the power circuit for driving the motor is interrupted during the operation of the motor, arc may be generated at the contacts between the body of the power tool and the battery. Arc may adversely affect corrosion-resistance of the power tool.

SUMMARY OF THE INVENTION

It is, accordingly, an object of the invention to provide a technique to effectively prevent a power tool from being adversely affected when a battery is removed from the power tool.

According to the present invention, a power tool is provided that includes a tool bit, a motor that drives the tool bit, a body that houses the motor, a battery detachably coupled to the body so as to supply driving current to operate the motor, a control device that controls the operation of the motor and a power circuit that leads the driving current from the battery to the motor. Within the power tool, the control device stops the motor prior to an interruption of the power circuit when the battery is disengaged from the body in order to prevent a driving current from being passed through the power circuit. As a result, arc can be effectively prevented from being generated between the battery and the body of the power tool.

Other objects, features and advantages of the present invention will be readily understood after reading the following detailed description together with the accompanying drawings and the claims.

BRIEF DESCRIPTION OF THE DRAWINGS

FIG. 4 shows the circuit structure as shown in FIG. 3. FIG. 4 shows a state that the engagement between the battery pack and the body is released.

FIG. 5 shows the circuit structure as shown in FIG. 3. FIG. 5 shows a state that the battery pack is removed from the body.

DETAILED DESCRIPTION OF THE INVENTION

According to the present invention, a representative battery-typed power tool is provided. The representative power tool may include a tool bit, a motor, a body, a battery, a control device and a power circuit. The motor drives the tool bit. The body houses the motor. The battery is detachably coupled to the body so as to supply driving current to operate the motor. The control device controls the operation of the motor. The power circuit leads the driving current from the battery to the motor. Within the power tool, the control device stops the motor prior to an interruption of the power circuit when the battery is disengaged from the body in order to prevent a large driving current from being passed through the power circuit.

The control device according to the present invention is adapted and arranged to stop the motor prior to an interruption of the power circuit when the battery is disengaged from the body. In the present teachings, the state in which "the battery is disengaged from the body" widely involves not only the state in which the battery is removed from the body, but the state in which the battery is incompletely engaged on the body. In other words, it involves an improperly mounted state or the state in which actually the battery is not completely or properly engaged on the body even though outwardly it looks properly engaged thereon.

When the battery is disengaged from the body, the control device stops the motor prior to an interruption of the power circuit. Even if the battery is removed from the body during supply of the driving current from the battery to the motor via the power circuit and even if the power circuit is interrupted, the motor is already in a shutdown state, because the motor stops prior to the interruption of the power circuit. As a result, decrease of durability of the power tool can be prevented which may otherwise be caused by a large current passing through the power circuit to drive the motor. Further, arc can be prevented from being generated at the connecting terminal. Preferably, sufficient time difference may be provided between the shutdown of the motor and the interruption of the power circuit in order to prevent generation of arc.

In the present teachings, the "tool bit" widely includes tools for battery-type drills, grinders, impact drivers, impact wrenches, cutters, trimmers, circular saws and reciprocating saws. The motor for driving the tool bit typically comprises a DC motor or a DC brushless motor. Preferably, the body may have a motor housing and a hand grip. In this case, the battery may preferably be coupled to the motor housing or to the hand grip. A rechargeable battery may typically be utilized. In order to "stop the motor" according to the present teachings, a driving control circuit of the motor may preferably be physically disconnected in response to the disengagement of the battery from the body. Otherwise, a signal to stop the motor may preferably be outputted in response to the disengagement of the battery from the body.

As one aspect of the present invention, the power tool may preferably include an engagement device that locks the battery to the body such that the battery can be removed. In this case, the control device may preferably be adapted to stop the motor prior to an interruption of the power circuit when the locked engagement by the engagement device between the battery and the body is released.

In the present teachings, the state in which "the locked engagement by the engagement device between the battery and the body is released" widely embraces not only the state in which the battery is completely locked to the body by the engagement device, but the state in which actually it is not completely locked by the engagement device even though outwardly it looks completely locked by the engagement device. Therefore, the power tool can detect and signal an improperly mounted state of the battery. Specifically, because the motor stops when the battery is improperly mounted on the body via the engagement device, user of the power tool can immediately notice that the battery is not properly mounted. The engagement device may be provided either on the battery side or the body side.

As one aspect of the present invention, the power tool may preferably include a first connecting terminal and a second connecting terminal. The both terminals may be provided between the battery and the body. The first connecting terminal may partially form the power circuit. The second connecting terminal may be adapted to turn on and off in response to the mounted state of the battery. When the battery is disengaged from the body, the second connecting terminal may preferably be disconnected so as to stop the motor before the first connecting terminal is disconnected. For stopping the motor, a driving control circuit of the motor may be physically disconnected or a signal to stop the motor may be generated.

Preferably, the length of the second connecting terminal may be shorter than the length of the first connecting terminal. When the battery is detached from the body, the shorter second connecting terminal is disconnected. Subsequently, the longer first connecting terminal is disconnected. In this case, at the point when the power circuit for driving the motor is interrupted due to disconnection of the first connecting terminal, the motor is already in a shutdown state due to disconnection of the second connecting terminal. Thus, arc between the battery and the body can be prevented.

According to one aspect of the present teachings, a method of using a battery-type power tool may include the step of stopping the motor prior to an interruption of the driving current to the motor when the battery is disengaged from the body. According to this method, the motor is already in a shutdown state at the point when the battery is removed from the body. Therefore, arc can be effectively prevented from being generated between the battery and the body and thus the power tool can be used in the explosion-proof condition. This method may be used with a power tool having the aforementioned preferable features of the power tools in suitable combination.

According to the present teachings, the battery may be attached to the body via an attaching device. The "attaching" or "attaching device" widely embraces various manners of connecting the battery to the body. Specifically, it embraces not only engaging the battery firmly on the body, but also a connecting manner in which it is difficult or impossible to detach the battery from the body unless the attaching device disposed between the battery and the body is released.

According to the present invention, when the attaching of the battery to the body by means of the attaching device is released, the control device stops the motor prior to an interruption of the power circuit. Even if the battery is removed from the body during supply of driving current from the battery to the motor via the power circuit, then the motor is already in a shutdown state, because the motor stops prior to an interruption of the power circuit when the attaching of the battery to the body by the attaching device is released. As a result, decrease of durability of the power tool can be prevented which may otherwise be caused by a large current passing through the power circuit to drive the motor. Further, arc can be prevented from being generated at the connecting terminals.

The attaching device may preferably comprise a battery cover that covers the battery on the body. In this case, when the battery cover is opened, the motor stops prior to an interruption of the power circuit. The battery cover may be configured to cover the battery and to engage and retain the battery onto the body. Otherwise, the battery cover may be configured to simply cover the battery.

Alternatively, the attaching device may comprise an adapter that is disposed between the battery and the body. In this case, when the adapter between the battery and the body is released, the motor stops prior to an interruption of the power circuit.

Each of the additional features and method steps disclosed above and below may be utilized separately or in conjunction with other features and method steps to provide improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
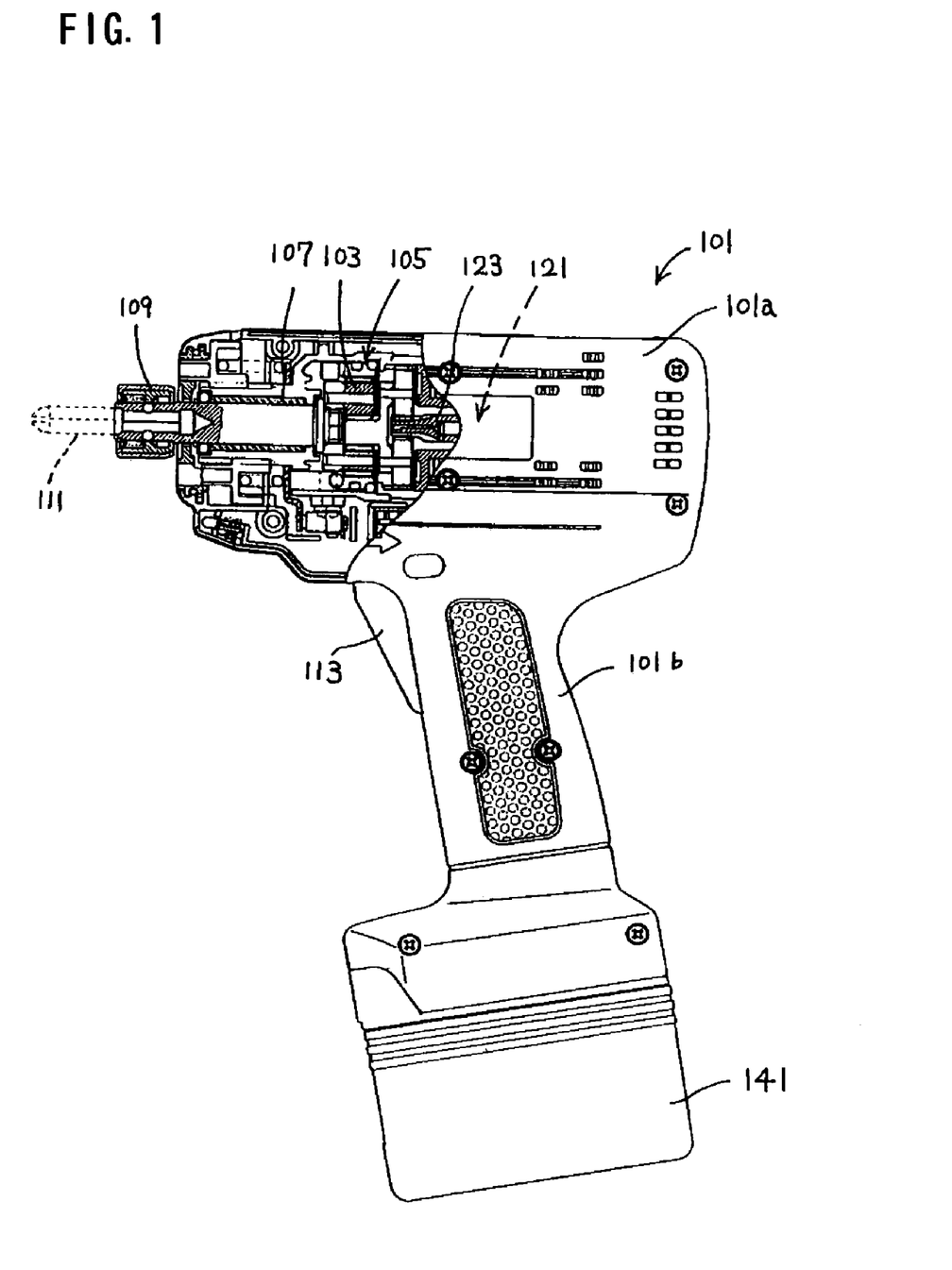
FIG. 1 shows an electric screwdriver according to a representative embodiment of the invention.

FIG. 1 shows a representative electric screwdriver 101 according to the present invention. The screwdriver 101 is a feature that corresponds to one example of the "power tool" according to the present invention. The screwdriver 101 may include a motor housing 101a and a grip 101b. The motor housing 101a houses a DC brushless motor 121, a motor drive shaft 123, a speed change mechanism 105 and a spindle 107. The speed change mechanism 105 includes planetary gears. A bit mounting chuck 109 and driver bit 111 are mounted to the end of the spindle 107.

The driver bit 111 is a feature that corresponds to the "tool bit" according to the present invention. A trigger switch 113 is provided on the upper end portion of the grip 101b. A battery 141 is removably mounted on the lower end portion of the grip 101b. The motor housing 101a and the grip 101b define a body 103 of the screwdriver 101.

Figure 2:
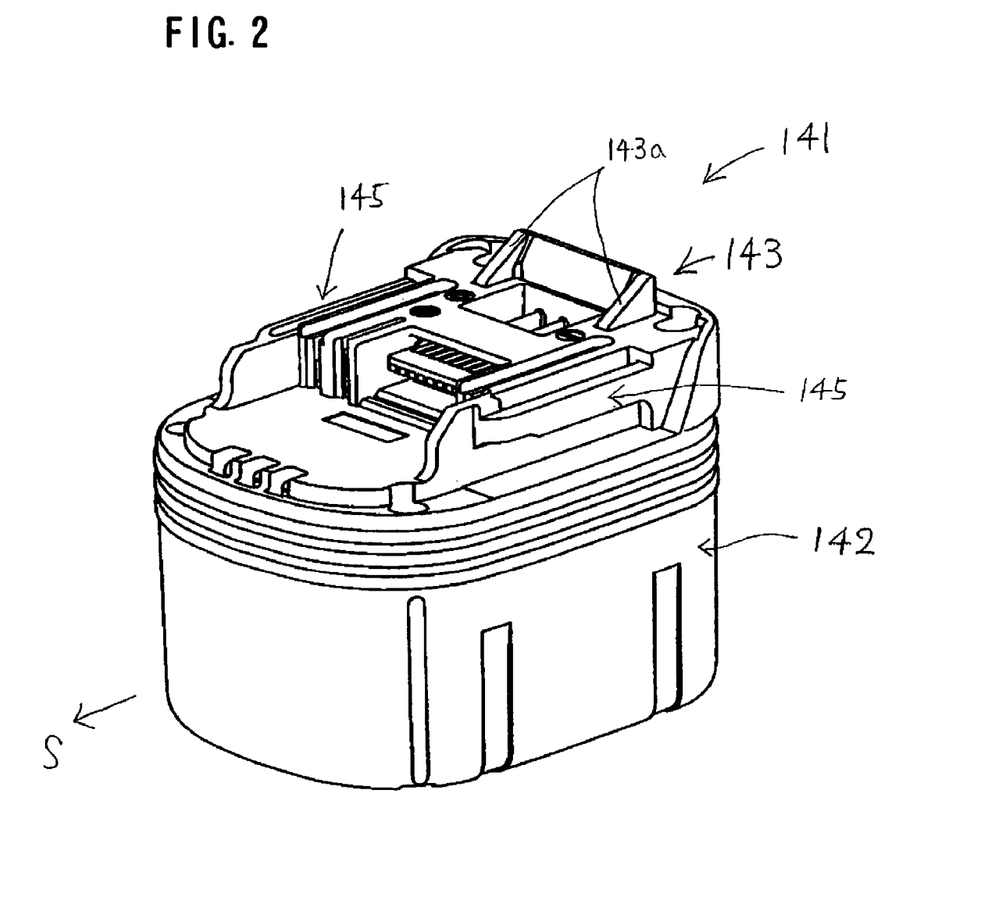
FIG. 2 shows a battery pack utilized within the representative embodiment.

FIG. 2 shows a battery 141 according to this embodiment. The battery 141 is contained within a battery pack 142 that functions as a battery housing. An engagement device 143 and a pair of mounting guides 145 are disposed on the top of the battery pack 142. The engagement device 143 retractably protrudes upward from the battery pack 142. Further, in this embodiment, a battery pack mounting check switch 144 is provided so as to turn on and off in response to the movement of the engagement device 143 that protrudes from or retracts into the battery pack 142. The mounting guides 145 engage with the bottom of the grip 101b (see FIG. 1) when the battery pack 142 is mounted on the grip 101b.

Specifically, the mounting guides 145 are engaged in the horizontal direction with the grip 101b of the screwdriver 101 as shown in FIG. 1. The direction of mounting the battery pack 142 to the bottom of the grip 101b is shown by an arrow "S" in FIG. 2. When the battery pack 142 is further pushed forward via the mounting guides 145, an inclined surface 143a of the engagement device 143, which surface faces forward in the mounting direction, is pressed against the bottom of the grip 101b. As a result, the engagement device 143 retracts into the battery pack 142, thereby allowing the battery pack 142 to be further pushed forward into the mounted position. Thus, the battery pack 142 can be mounted on the grip 101b. In this embodiment, the battery pack mounting check switch 144, which will be described below in detail, is configured to detect the "battery mounted state" and to output the corresponding signal to the control circuit 151.

Figure 3:
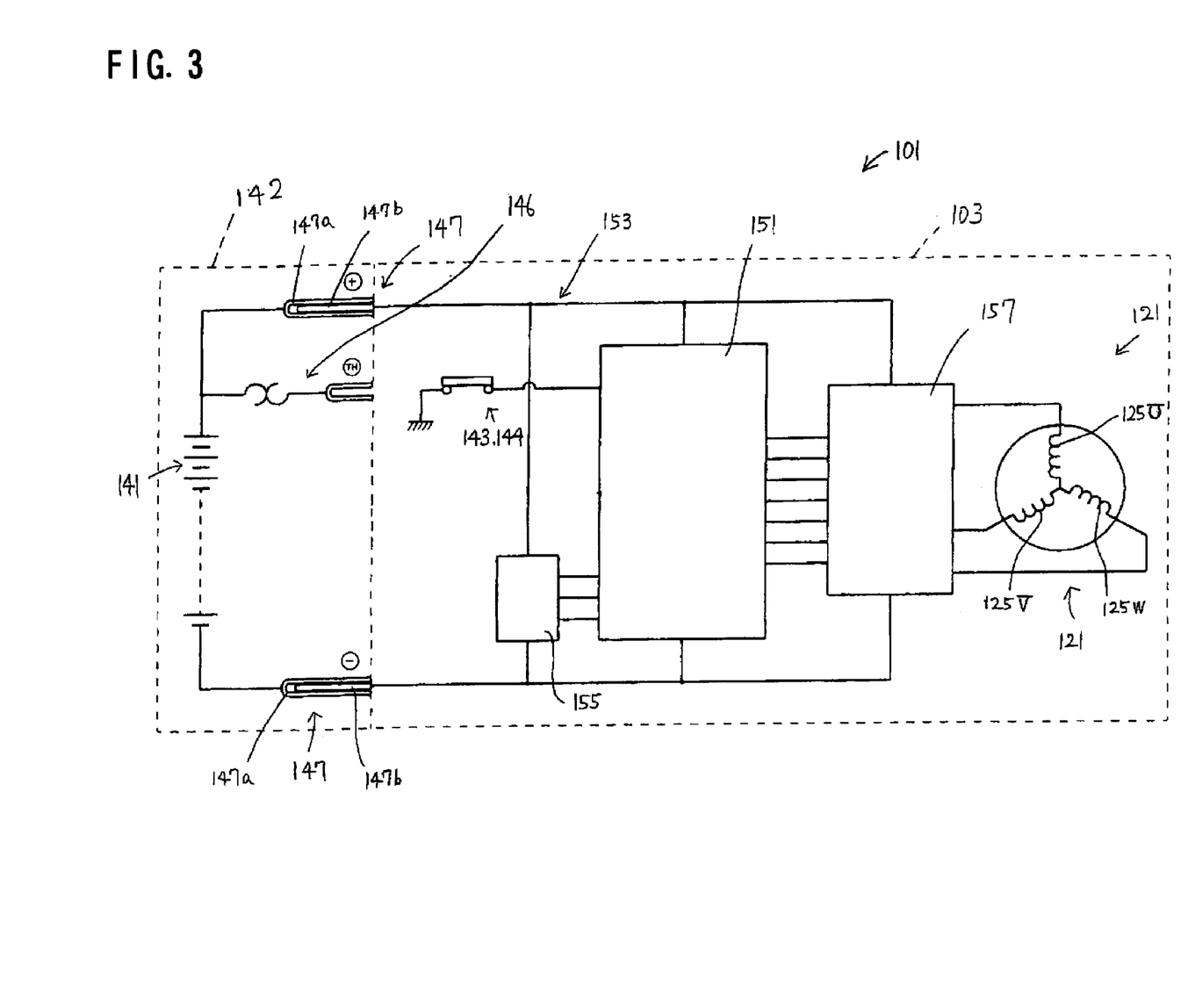
FIG. 3 shows a circuit structure for driving a motor within the screwdriver according to the representative embodiment.

As it is shown in FIG. 3, the screwdriver 101 according to this embodiment mainly comprises a control circuit 151 to control the operation of the DC brushless motor 121, a power circuit 153 for supplying driving current from the battery 141 to the DC brushless motor 121, a position detecting circuit 155, a FET bridge 157 and the battery pack mounting check switch 144. These components are disposed within the body 103. The battery 141 contained in the battery pack 142 is electrically connected to the power circuit 153 in the body 103 via a connecting terminal 147. The control circuit 151 and the connecting terminal 147 are features that correspond to the "control device" and the "first connecting terminal" according to the present teachings, respectively.

The DC brushless motor 121 is connected to the battery 141 via the connecting terminal 147 and the power circuit 153 in order to receive the supply of the driving current. Further, the motor 121 is connected to the control circuit 151 and the FET bridge 157 that is connected to the control circuit 151 in order for the driving control. The DC brushless motor 121 is driven by means of a three-phase bipolar driving circuit.

Although it is not particularly shown, six FETs (field-effect transistors) are provided within the FET bridge 157 for rectangular wave driving of the DC brushless motor 121. The FETs are connected to three coils (armature winding) 125U, 125V, 125W for driving a rotor (not particularly shown in the drawings) of the DC brushless motor 121. The coils 125U, 125V, 125W are drivingly controlled based upon 120° energizing rectangular wave by selectively applying a voltage to the respective gates of the FETs.

The position detecting circuit 155 includes Hall elements and is connected to the control circuit 151. The position detecting circuit 155 detects the rotating positions of the rotor of the DC brushless motor 121 and outputs a rotor position signal to change the phase sequence in supplying the motor driving signals to the respective coils 125U, 125V, 125W in accordance with the respective phases (energizing start timing).

The battery pack mounting check switch 144 is a feature that corresponds to the "second connecting terminal" according to the present invention and is arranged to turn on and turn off in response to the movement of the engagement device 143 (see FIG. 2). Specifically, when the battery pack 142 is not completely engaged with the grip 101b by the engagement device 143, the battery pack mounting check switch 144 is turned off, thereby detecting the "battery pack non-mounted state". Thus, the switch 144 outputs the corresponding signal to the control circuit 151. On the other hand, when the battery pack 142 is engaged with the grip 101b by the engagement device 143, the battery pack mounting check switch 144 is turned on and detects the "battery pack mounted state". Thus, the switch 144 outputs the corresponding signal to the control circuit 151. FIG. 3 shows the state in which the battery pack mounting check switch 144 is turned on.

Further, as it is shown in FIG. 3, the battery 141 is disposed within the battery pack 142 and is connected to the power circuit 153 of the body 103 via the connecting terminal 147. The battery pack 142 further includes overheat preventing system 146 that is mainly defined by a thermistor. Overheat preventing system 146 serves to prevent excessive heating of the battery 141 during the operation.

The connecting terminal 147 includes a female-type battery-side terminal 147a and a male-type body-side terminal 147b that can be fitted into the battery-side terminal 147a. FIG. 3 shows the state in which the body-side terminal 147b is fitted into the battery-side terminal 147a.

Operation of the electric screwdriver 101 according to the representative embodiment will now be explained. When a user of the screwdriver 101 operates a trigger switch 113 of the screwdriver 101 as shown in FIG. 1, the DC brushless motor 121 is driven by means of the battery 141. The rotational movement of the DC brushless motor 121 is transmitted to the spindle 107 via the motor drive shaft 123, while being decelerated by the speed change mechanism 105. When the spindle 107 is thus rotated by the motor 121, the driver bit 111 coupled to the bit mounting chuck 109 on the front end of the spindle 107 is also rotated. Thus, the screw tightening operation is performed.

During the operation of the screwdriver 101, the battery pack 142 may be removed from the bottom of the grip 101b when charging or replacing the discharged battery 141. In such a case, the battery pack 142 is removed from the grip 101b in the direction opposite to the mounting direction S. At this time, the engagement of the battery pack 142 by the engagement device 143 is released and the battery pack mounting check switch 144 is turned off.

When the battery pack 142 is mounted on the grip 101b again after it is once removed, the battery pack 142 may possibly be incompletely engaged on the grip 101b. In such a case, the user of the screwdriver 101 may unintentionally remove the battery pack 142 from the grip 101b. If the battery pack 142 is removed from the grip 101 during operation of the screwdriver 101, because a large current for driving the DC brushless motor 121 passes through the power circuit 153, arc (spark) may be generated around the connecting terminal 147.

Figure 4:
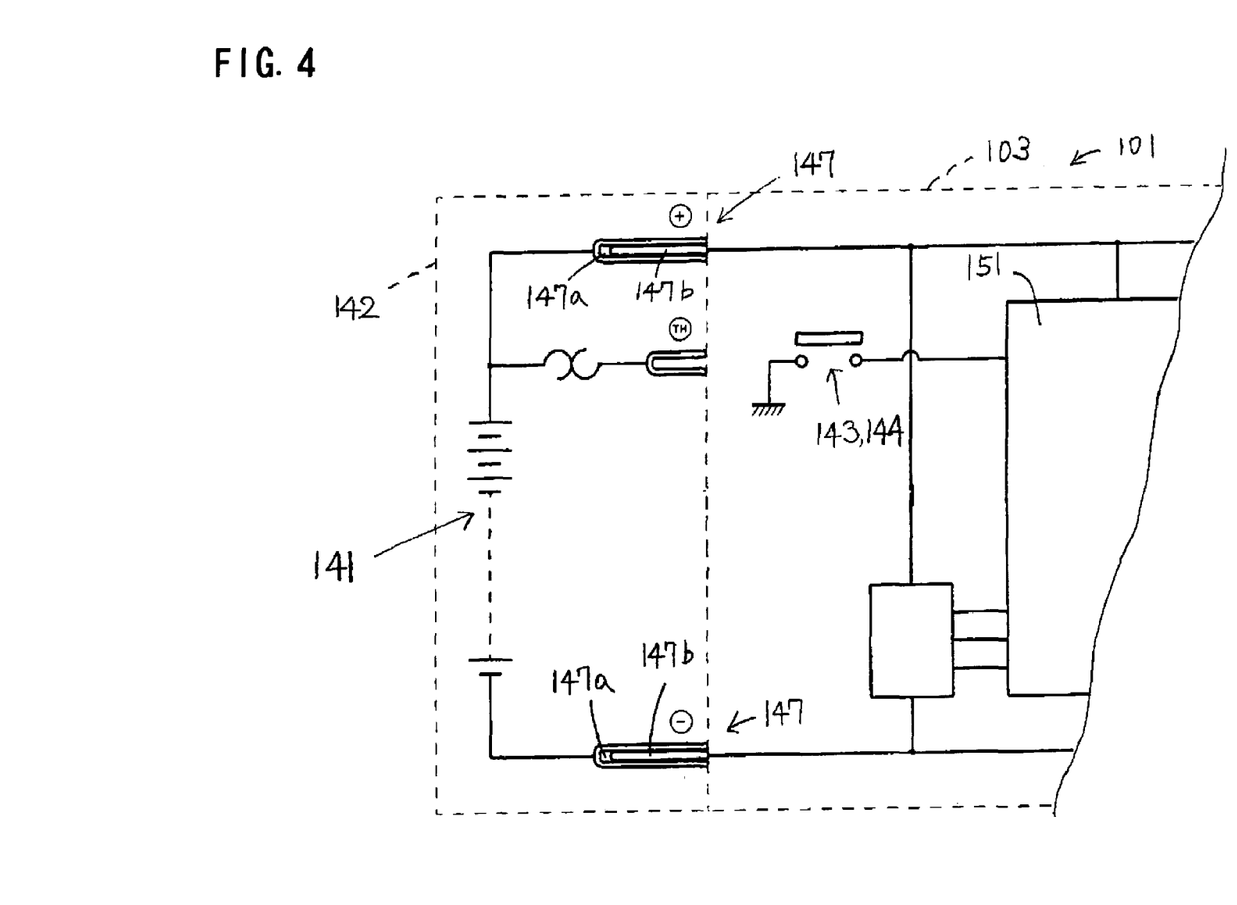

In this respect, according to the representative embodiment, when the battery pack 142 is incompletely mounted on the grip 101b (body 103) of the battery pack 142, the battery pack mounting check switch 144 is turned off as shown in FIG. 4 and the control circuit 151 detects the battery as non-mounted state. As a result, the control circuit 151 subsequently stops the DC brushless motor 121 via the FET bridge 157 as shown in FIG. 3. Specifically, in the state as shown in FIG. 4, although the connecting terminal 147 is kept connected, the battery pack mounting check switch 144 is in the off position, so that the DC brushless motor 121 is not driven.

Figure 5:
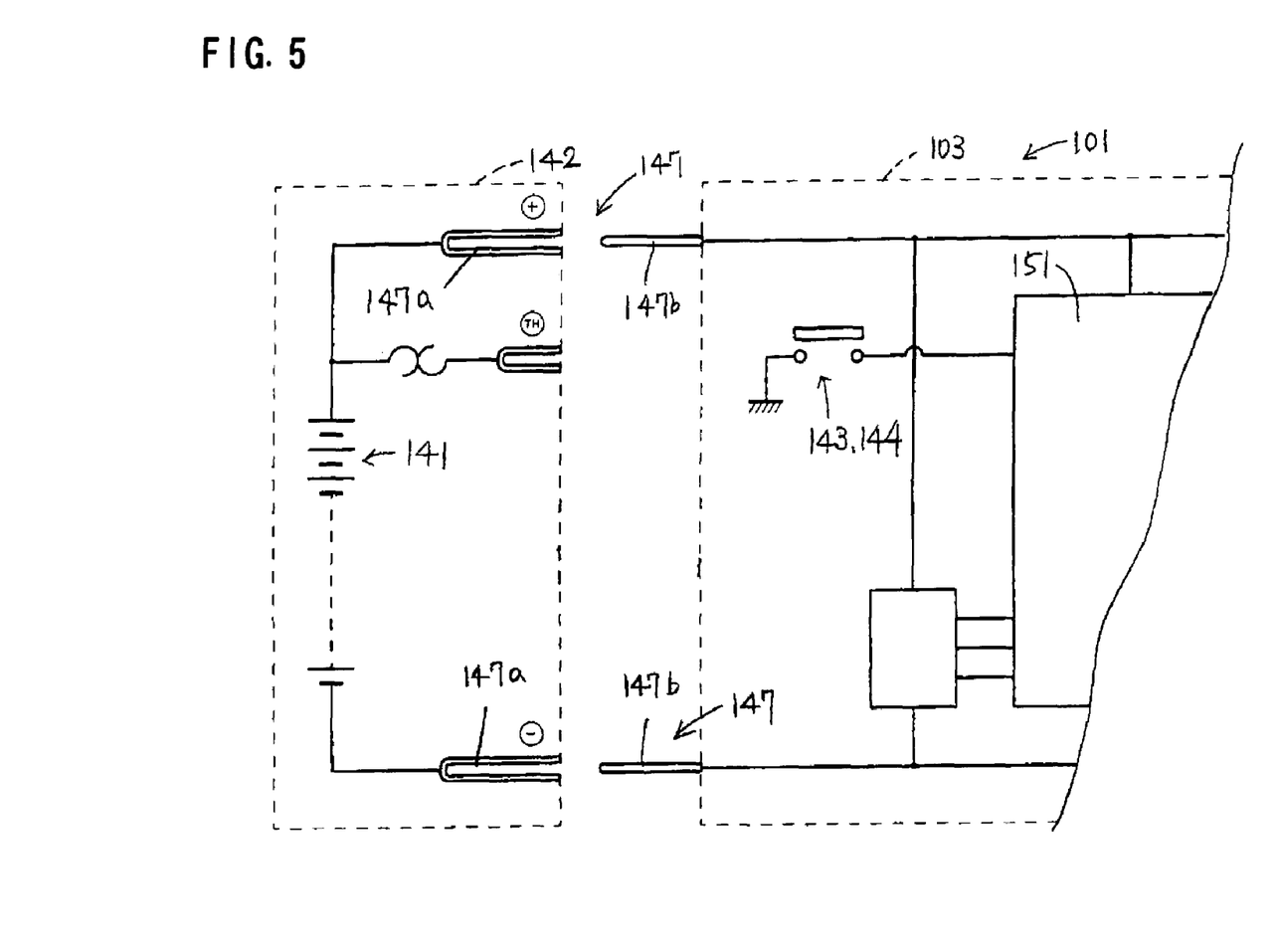

On the other hand, FIG. 5 shows the state in which the battery pack 142 is removed from the body 103. In the connecting terminal 147 as shown in FIG. 5, the body-side terminal 147b is removed from the battery-side terminal 147a. At this time, the DC brushless motor 121 is already in a shutdown state. Therefore, a large driving current is not passed through the power circuit. As a result, arc can be effectively prevented from being generated at the connecting terminal 147 and thus, the screwdriver 101 can be used in the explosion-proof condition.

Particularly in the representative embodiment, the DC brushless motor 121 can be controlled based upon turning on and turning off of the battery pack mounting check switch 144 provided in the engagement device 143. Specifically, when the battery pack 142 is improperly mounted on the body 103, the battery pack mounting check switch 144 in the engagement device 143 is turned off and thus the DC brushless motor 121 stops. Therefore, sufficient time to prevent arc can be secured between the shutdown of the DC brushless motor 121 and the interruption of the power circuit 153.

Further, according to the representative embodiment, even when the battery pack 142 is actually mounted in an incomplete manner on the grip 101b as if it were properly mounted, the motor stops by means of the battery pack mounting check switch 144 coupled to the engagement device 143. Therefore, the user of the screwdriver 101 can promptly notice improper mounting of the battery pack 142.

(First Modification of the Representative Embodiment of the Invention)

Figure 6:
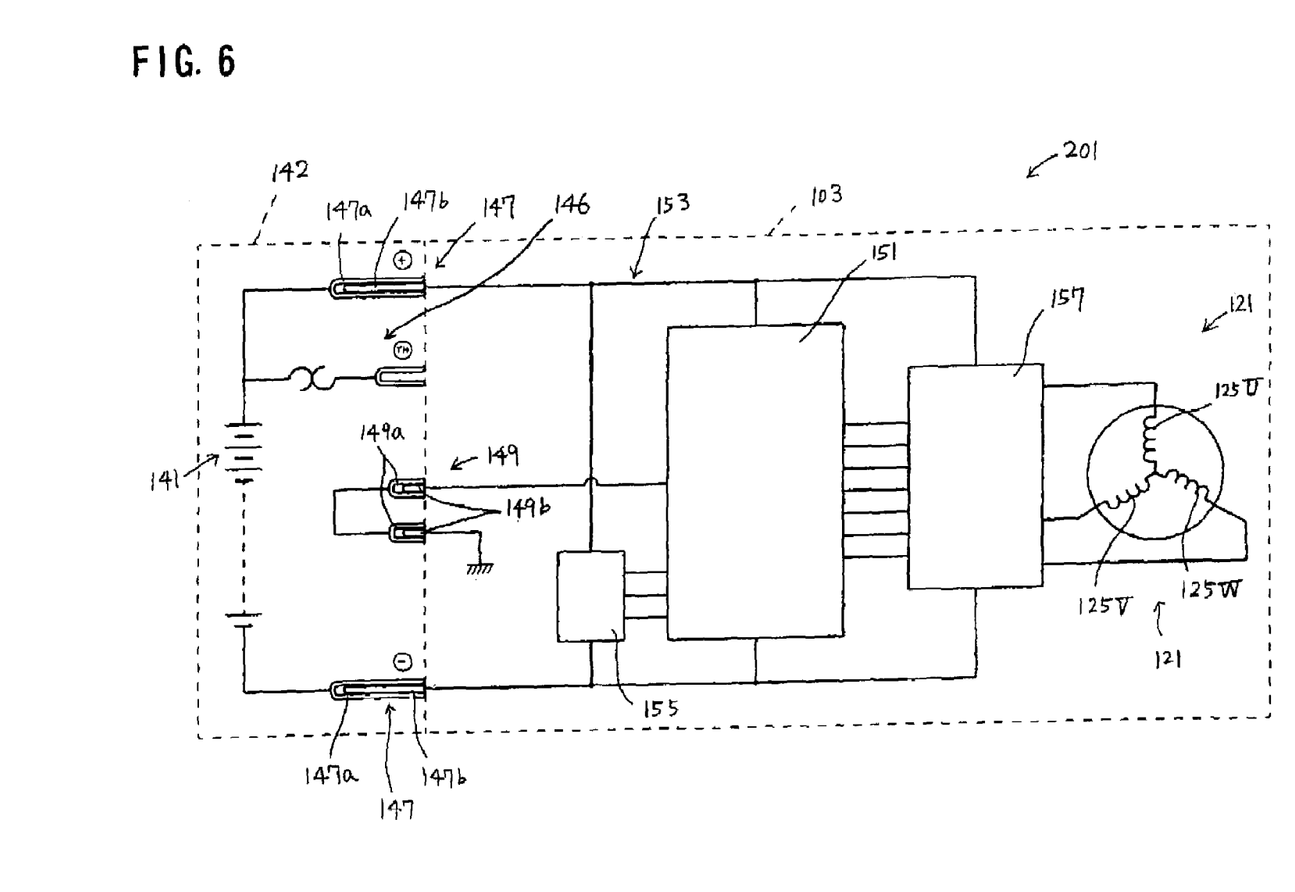
FIG. 6 shows a first modification of the representative embodiment.

A first modification of the representative embodiment is shown in FIGS. 6 to 9. FIG. 6 shows a circuit structure for driving the DC brushless motor 121 in an electric screwdriver 201 according to the first modification to the representative embodiment of the present invention. In the following description, components that have the same construction as in the above-described representative embodiment will be identified by the same numerals.

As it is shown in FIG. 6, the electric screwdriver 201 according to the first modification is provided with a mounting detection terminal 149 for detecting the mounted state of the battery pack 142 onto the body 103, instead of the battery pack mounting check switch 144 as shown in FIG. 3. The mounting detection terminal 149 includes a female-type battery-side terminal 149a provided on the battery pack 142 and a male-type body-side terminal 149b provided on the body 103 and can be fitted into the battery-side terminal 149a.

In the second modification, the body-side terminal 149b of the mounting detection terminal 149 is provided to be shorter than the body-side terminal 147b of the connecting terminal 147. The battery-side terminal 149a of the mounting detection terminal 149 is shorter than the battery-side terminal 147a of the connecting terminal 147 so as to match with the body-side terminal 149b in length.

The DC brushless motor 121, the control circuit 151, the power circuit 153, the position detecting circuit 155, the FET bridge 157, the connecting terminal 147 and the overheat preventing system 146 utilized in the first modification are also utilized in this modification and therefore, detailed description for these components are abbreviated.

Figure 7:
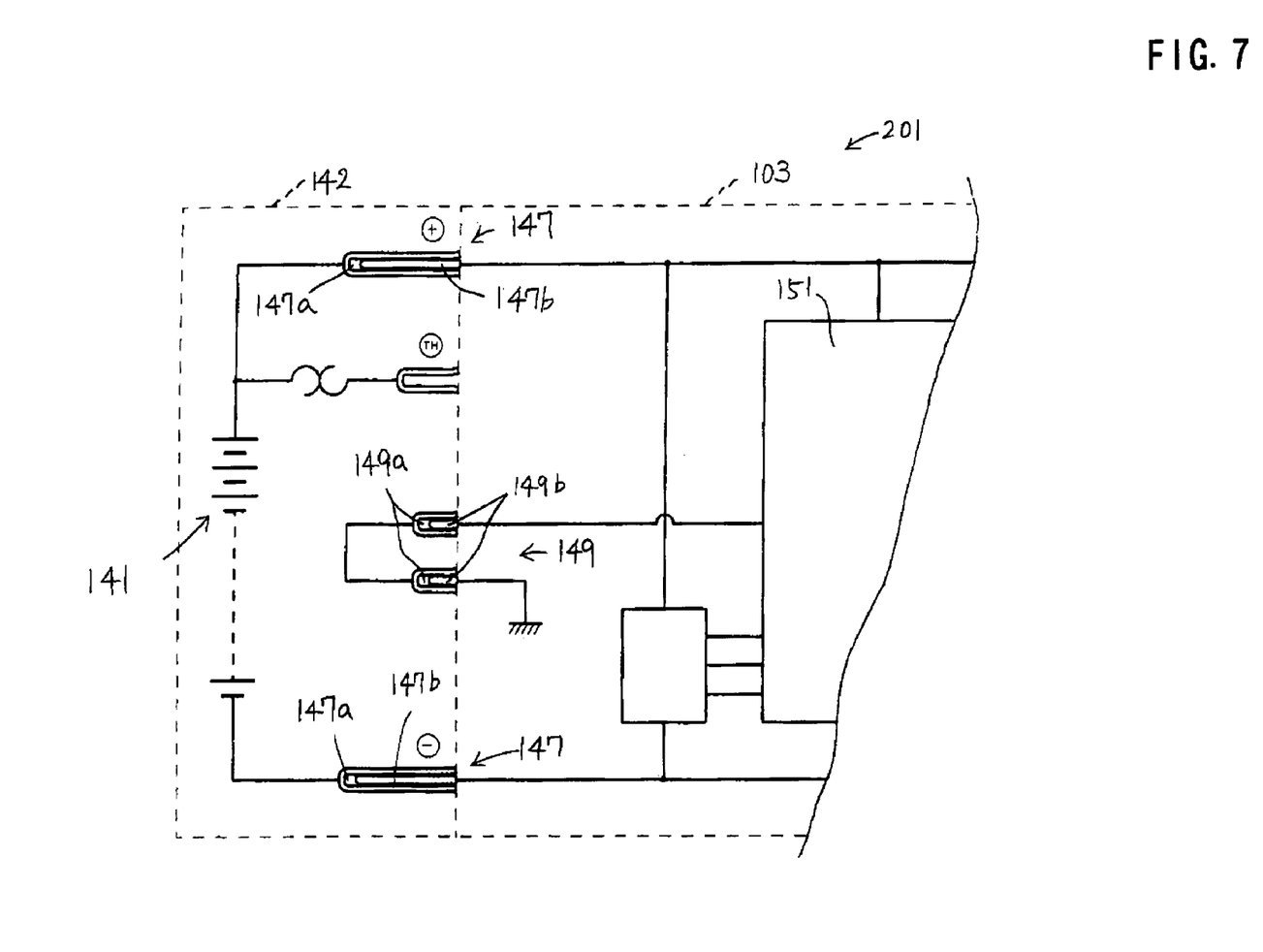
FIG. 7 shows a state in which the battery pack is mounted on the body according to the first modification as shown in FIG. 6.
Figure 8:
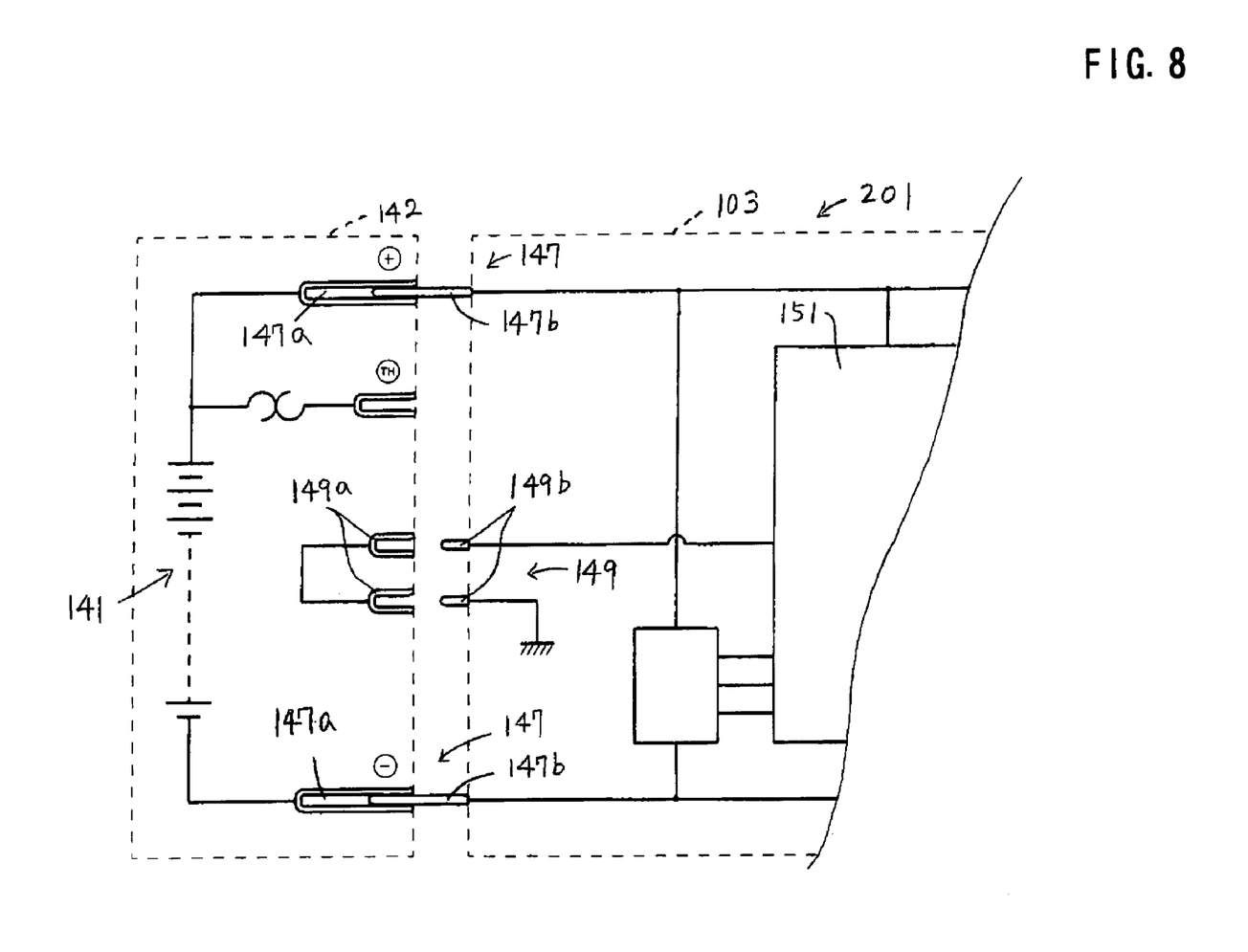
FIG. 8 shows a state in which the battery pack is being removed from the body according to the first modification.
Figure 9:
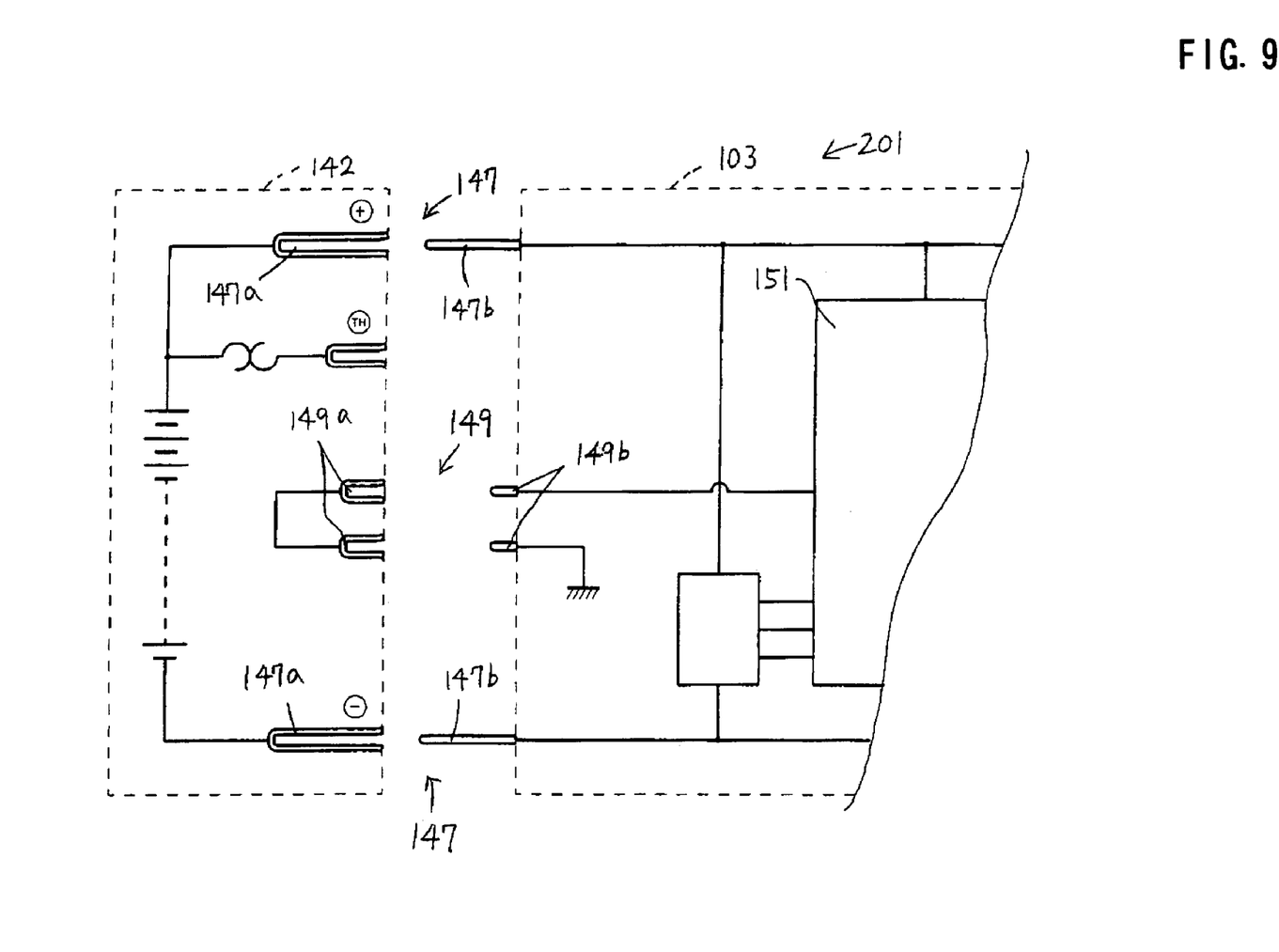
FIG. 9 shows a state in which the battery pack is completely removed from the body according to the first modification.

FIGS. 7 to 9 show different mounted states of the battery pack 142 onto the body 103 in this modification. FIG. 7 shows the state in which the battery pack 142 is properly mounted on the body 103 (hereinafter referred to as "properly mounted state"). FIG. 8 shows the state in which the battery pack 142 is beginning to be removed from the body 103 (hereinafter referred to as "removal beginning state"). FIG. 9 shows the state in which the battery pack 142 is completely removed from the body 103 (hereinafter referred to as "battery removed state").

In the properly mounted state as shown in FIG. 7, the connecting terminal 147 and the mounting detection terminal 149 are kept connected. Therefore, the battery 141 is electrically connected to the body 103 side by means of the connecting terminal 147 and supplies a driving current. Further, the control circuit 151 detects the properly mounted state of the battery pack 142 via the mounting detection terminal 149.

If the battery pack 142 is incompletely mounted on the body 103, the battery pack 142 may be unintentionally removed from the body 103 during the operation of the screwdriver 101. At the beginning of such removal of the battery pack 142 from the body 103, as it is shown in FIG. 8, the mounting detection terminal 149 is disconnected while the connecting terminal 147 is kept connected, due to the length difference such that the body-side terminal 149b of the mounting detection terminal 149 is shorter than the body-side terminal 147b of the connecting terminal 147.

In this state, the battery 141 is electrically connected to the body 103 via the connecting terminal 147, while the mounting detection terminal 149 is disconnected. The control circuit 151 detects the removal beginning state of the battery pack 142. Thus, the control circuit 151 outputs a control signal to stop the DC brushless motor 121.

Further, when the battery pack 142 is completely removed from the body 103, as it is shown in FIG. 9, the connecting terminal 147 as well as the mounting detection terminal 149 is disconnected. In this case, when the connecting terminal 147 is disconnected, the DC brushless motor 121 is already in a shutdown state. Thus, according to this modification, the power circuit can be disconnected after the DC brushless motor 121 has been stopped. As a result, generation of arc can be effectively prevented and thus the screwdriver can be used in the explosion-proof condition.

(Second Modification of the Representative Embodiment of the Invention)

Figure 10:
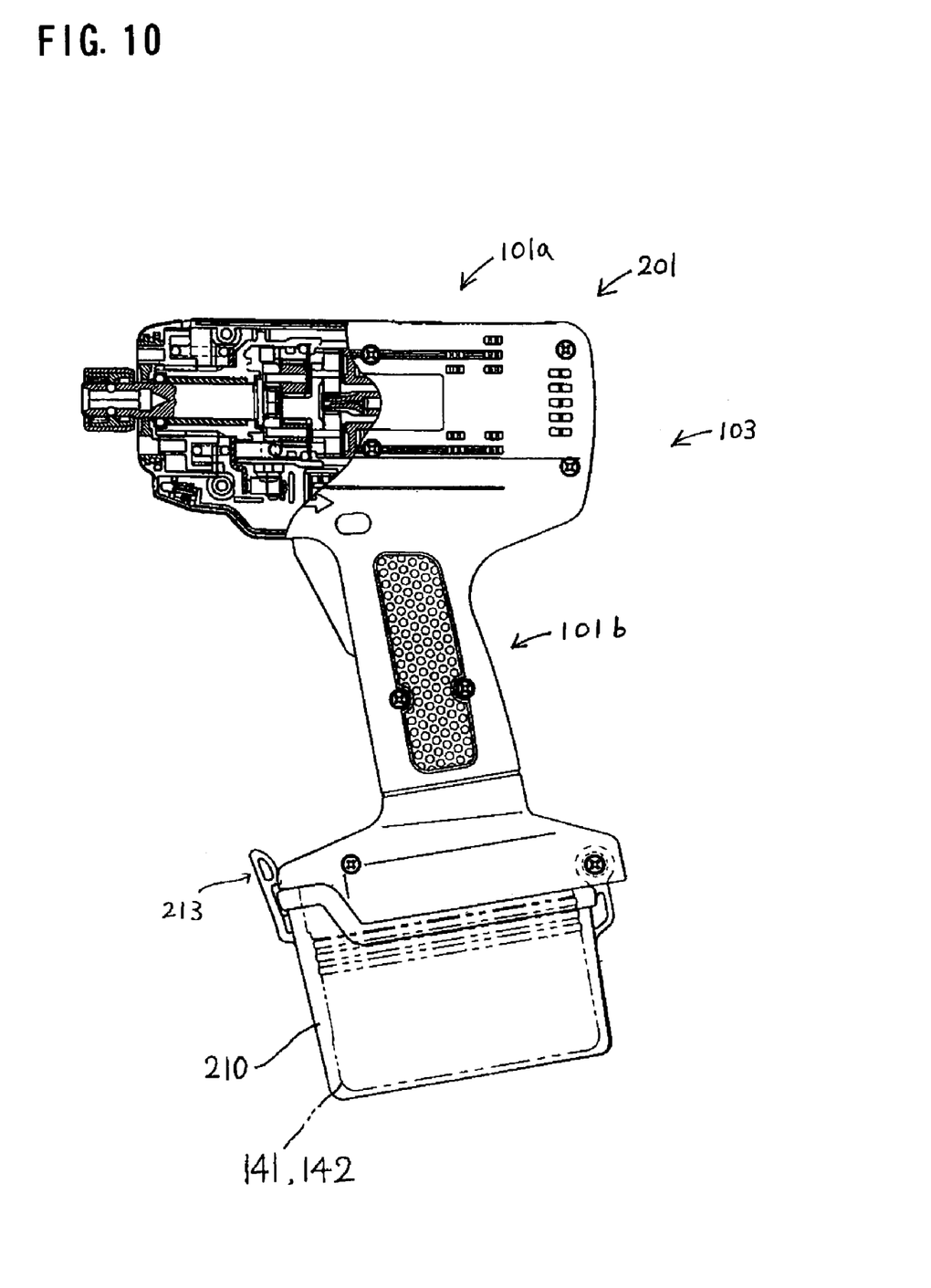
FIG. 10 shows a second modification of the representative embodiment.

A second modification of the above described representative embodiment of the invention will now be explained with reference to FIGS. 10 to 12. FIG. 10 shows an entire structure of an electric screwdriver 201 according to the second modification. Components having the same construction as in the above embodiment or the first modification will be identified by the same numerals and will not be described in detail for the sake of convenience.

As shown in FIG. 10, the electric screwdriver 201 according to the second modification includes a body 103 having a motor housing 101a and a grip 101b, and a battery pack 142 containing a battery 141. The battery pack 142 is mounted on the lower end of the grip 101b and covered with a battery cover 210.

Figure 11:
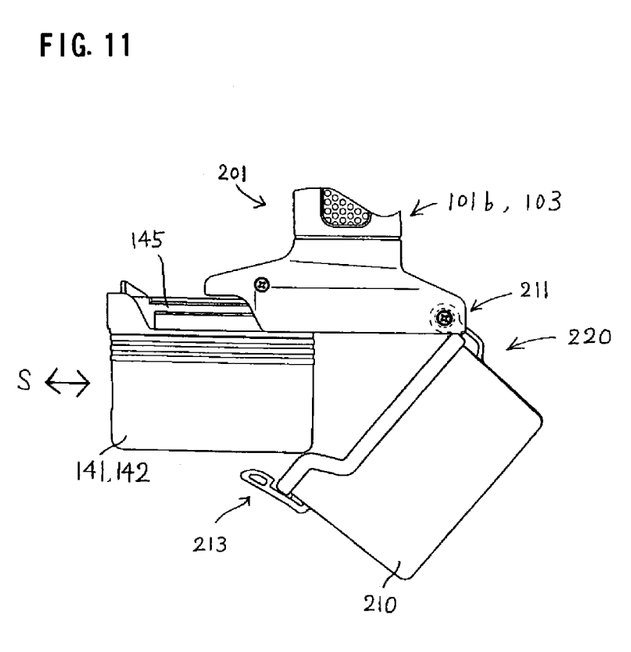
FIG. 11 shows a battery and a battery cover utilized within the second modification.

The detailed construction of the battery cover 210 is shown in FIG. 11. The battery cover 210 is mounted to the rear end portion of the grip 101b and can be rotated about an axis (center of rotation) 211. An engagement member 213 is disposed on the edge end of the battery cover 210 that is opposed to the axis 211 and serves to engage with the body 103 and retain the battery cover 210 onto the body 103. In order to mount the battery pack 142 onto the body 103, as it is shown in FIG. 11, the battery pack 142 is set onto the grip 101b by means of the rail-like pair of mounting guides 145 that are formed on both side surfaces of the battery pack 142. The battery pack 142 is slidingly guided by the mounting guides 145 in the mounting direction as shown by an arrow "S" in FIG. 11. The battery pack 142 is thus mounted on the grip 101b and then engaged on the bottom of the grip 101b by means of the engagement device 143 on the battery pack 142 (not particularly shown in FIG. 11).

In this state, the battery cover 210 is rotated toward the grip 101b so as to cover the battery pack 142. As it is shown in FIG. 10, the battery cover 210 to cover the battery pack 142 is engaged and retained onto the body 103 by means of the engagement member 213.

On the other hand, in order to remove the battery pack 142, the engagement member 213 is disengaged from the body 103 and the battery cover 210 is rotated around the axis 211 so as to expose the battery pack 142. Then, the battery pack 142 can be pulled out horizontally (in the direction shown by arrow "S" in FIG. 11) with the aid of the mounting guides 145, while disengaging the engagement device 143 (not particularly shown) from the body 103. Thus, the battery pack 142 is removed from the body 103.

In the screwdriver 201 according to the second modification, a battery cover mounting check switch 220 is provided. This switch 220 is turned on and turned off in response to the opening and closing movements of the battery cover 210 for covering the battery pack 142 (or battery 141).

Figure 12:
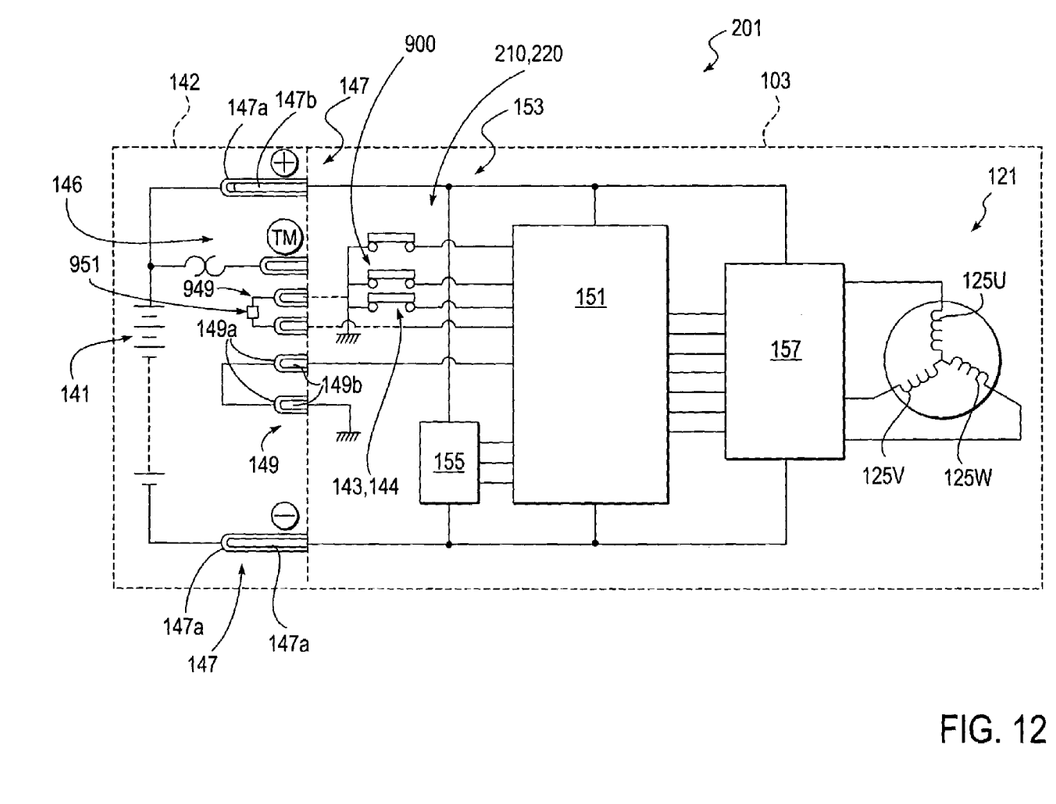
FIG. 12 shows a circuit structure for driving the motor according to the second modification.

FIG. 12 shows a circuit structure for driving the motor within the screwdriver 201 according to the second modification. The screwdriver 201 includes the body 103 and the battery pack 142. The DC brushless motor 121, control device 151 having the control circuit, power circuit 153, position detection circuit 155, and FET bridge 157 are disposed within the body 103. These components have the same construction as in the above-described embodiment. Further, according to the second modification, the battery cover mounting check switch 220 is electrically connected to the control circuit in the control device 151 and actuated in response to the opening and closing movement of the battery cover 210 for covering the battery 141.

Battery 141, overheat preventing system 146, connecting terminal 147 and mounting detection terminal 149 are disposed in the battery pack 142. These components have the same construction as in the above-described embodiment.

In the second modification, not only when the battery pack mounting check switch 144 is turned off or when the body-side terminal 149b is removed from the battery-side terminal 149a in the mounting detection terminal 149, but also when the battery cover mounting check switch 220 is turned off, the control device 151 outputs the signal to stop the DC brushless motor 121 prior to the interruption of the power circuit 153. Specifically, when the battery cover 210 covering the battery pack 142 is removed or opened, the DC brushless motor 121 is promptly stopped. As a result, even if the battery pack 142 is thereafter removed from the body 103, which causes the power circuit 153 to be interrupted, arc can be prevented from being generated at the connecting terminal 147 when the battery pack 142 is removed from the body 103. Therefore, the screwdriver 201 can be used in the explosion-proof condition.

As a further modification, an adapter may be adapted and arranged between the battery pack 142 and the body 103 (grip 101b). In such modification, a switch may be provided that can be turned on and off in response to the mounted state of the adapter. According to this modification, when the adapter mounting check switch is turned off, the DC brushless motor 121 stops before the power circuit 153 is interrupted.

In addition or alternatively, a lock-dial type hook or other similar means may be provided which engages and retains the battery pack 142 onto the body 13 (grip 101b). In such a case, a switch 900 may be provided which can detect based on the position of the lock dial as to whether the battery pack 142 is engaged onto the body 103. In this modification, when the lock-dial position detecting switch 900 is turned off, the DC brushless motor 121 stops prior to the interruption of the power circuit 153.

A switch 900 may be provided in association with the above-mentioned adapter or lock dial. In such a case, the switch 900 may be constructed, for example, in suitable combination of a magnet and a magnetic sensor that detects the proximity of the magnet.

In the above-described embodiment or modifications, the connecting terminal 147 and the mounting detection terminal 149 may have a male-type terminal on the battery pack 142 and a female-type terminal on the body 103 side. Further, any type of motor other than a DC brushless motor may be used to drive the driver bit 111.

The present teachings can be applied not only to the screwdrivers but also broadly to any other battery-typed power tools.

Further, the battery pack mounting check switch 144 coupled to the engagement device 143, the mounting detection terminal 149 having a male terminal that is shorter than the connecting terminal 147, and the battery cover mounting check switch 220 may preferably be combined entirely or in part. By combining these elements, even if malfunction takes place in any of the battery pack mounting check switch 144, the mounting detection terminal 149 and the battery cover mounting check switch 220, the DC brushless motor 121 can be reliably stopped prior to an interruption of the driving current from the battery 141.

Further, in a power tool using a battery indicator 951, a connecting terminal 949 for the battery indicator 951 may be shorter than the connecting terminal 147 for the power circuit. With such modified construction, if the battery pack 142 is unintentionally removed due to incomplete mounting of the battery pack 142 onto the grip 101b, the connecting terminal 949 of the battery indicator 951 can be disconnected before the connecting terminal 147 of the power circuit. As a result, arc can be effectively prevented.

I claim:

1. A power tool comprising:
    a tool bit;
    a motor that drives the tool bit;
    a body that houses the motor;
    a battery having power terminals detachably coupled to the body, wherein the battery supplies driving current to operate the motor;
    a power circuit that leads the driving current from the battery to the motor; and
    a control device that stops the motor after an engagement device on the battery begins physical disengagement from the body, but prior to the power terminals detaching completely from the body, thereby preventing an arc from being generated between the power terminals on the body.

2. The power tool as defined in claim 1, further comprising connecting terminals that include the battery terminals, that detachably lock the battery to the body, wherein the control device stops the motor prior to an interruption of the power circuit when the engagement between the battery and the body by the connecting terminals is released.

3. The power tool as defined in claim 1, further comprising a first connecting terminal and a second connecting terminal, the both terminals being provided between the battery and the body, the first connecting terminal forming the power circuit and the second connecting terminal being adapted to turn on and off in response to the mounted state of the battery, wherein when the battery is disengaged from the body, the second connecting terminal is disconnected so as to stop the motor before the first connecting terminal is disconnected.

4. The power tool as defined in claim 3, wherein the length of the second connecting terminal is shorter than the length of the first connecting terminal.

5. The power tool as defined in claim 3, wherein the battery includes a battery indicator and the second connecting terminal includes the battery indicator.

6. The power tool as defined in claim 1, wherein the control device stops the motor based on a motor driving stop signal that is generated when the engagement between the battery and the body is released.

7. A power tool comprising:
a tool bit;
a motor that drives the tool bit;
a body that houses the motor;
a battery detachably coupled to the body, wherein the battery supplies driving current to operate the motor;
an attaching device that attaches the battery to the body;
a power circuit that leads the driving current from the battery to the motor; and
a control device that controls the operation of the motor, wherein the control device stops the motor after the attaching device starts to be physically released from the body, but prior to the battery terminals detaching completely from the body, thereby preventing an arc from being generated between the battery terminals and the body.

8. The power tool as defined in claim 7, wherein the attaching device includes a battery cover to cover the battery on the body and the motor is stopped prior to an interruption of the power circuit when the battery cover is opened.

9. The power tool as defined in claim 7, wherein the attaching device includes a battery cover to cover the battery on the body, the proximity of the battery cover to the body is detected by a magnet and the motor is stopped prior to an interruption of the power circuit when the proximity of the battery cover to the body is not detected.

10. The power tool as defined in claim 7, wherein the attaching device includes a battery cover to cover the battery on the body and the motor is stopped prior to an interruption of the power circuit when the battery cover is disengaged from the body.

11. The power tool as defined in claim 7, wherein the attaching device includes a battery cover rotatably coupled to the body so as to cover the battery on the body and the motor is stopped prior to an interruption of the power circuit when the battery cover rotates around the rotating axis.

12. The power tool as defined in claim 7, wherein the attaching device includes a lock-dial type hook, wherein the control device stops the motor prior to an interruption of the power circuit in relation to the position of the lock-dial.

13. The power tool as defined in claim 7, wherein the attaching device includes an adapter that is disposed between the battery and the body and the motor is stopped prior to an interruption of the power circuit when the adapter is removed.

14. A method of using a power tool, wherein the power tool having a tool bit, a motor that drives the tool bit, a body that houses the motor, an engagement device and a battery detachably coupled to the body, the battery supplying a driving current to the motor, comprising:
stopping the motor after the engagement device physically disengages from the body but prior to the battery terminals detaching completely from the body, thereby preventing an arc from being generated between the battery terminals and the body.

15. A method as defined in claim 14, wherein the battery is detachably coupled to the body by means of an attaching device, comprising the step of:
stopping the motor prior to an interruption of the supply of the driving current to the motor when the attaching of the battery to the body by means of the attaching device is released.

16. A power tool comprising:
a tool bit,
a motor that drives the tool bit,
a body that houses the motor,
a battery detachably coupled to the body, wherein the battery supplies driving current to operate the motor,
a power circuit that leads the driving current from the battery to the motor and
means for controlling the operation of the motor, wherein the means for controlling stops the motor after an engagement device begins to physically disengage from the body but prior to the battery terminals detaching completely from the body, thereby preventing an arc from being generated between the battery terminals and the body.

17. A power tool comprising:
a tool bit,
a motor that drives the tool bit,
a body that houses the motor,
a battery detachably coupled to the body, wherein the battery supplies driving current to operate the motor,
means for attaching the battery to the body,
means for controlling the operation of the motor and
a power circuit that leads the driving current from the battery to the motor, wherein the means for controlling stops the motor after an engagement device begins to physically disengage from the body but prior to the battery terminals detaching completely from the body, thereby preventing an arc from being generated between the battery terminals and the body.

18. A power tool comprising:
a tool bit,
a motor that drives the tool bit,
a body that houses the motor,
a battery that supplies driving current to operate the motor,
an engagement device that detachably locks the battery to the body,
a control device that controls the operation of the motor and
a power circuit that leads the driving current from the battery to the motor, wherein the control device stops the motor after the engagement device begins to physically disengage from the body but prior to the battery terminals detaching completely from the body, thereby preventing an arc from being generated between the battery terminals and the body.

19. A power tool comprising:

a tool bit, a motor that drives the tool bit, a body that houses the motor, a battery detachably coupled to the body, wherein the battery supplies driving current to operate the motor, a control device that controls the operation of the motor, a power circuit that leads the driving current from the battery to the motor and a first connecting terminal and a second connecting terminal, the both terminals being provided between the battery and the body, the first connecting terminal forming the power circuit and the second connecting terminal being adapted to turn on and off in response to the mounted state of the battery, wherein the length of the second connecting terminal is shorter than the length of the first connecting terminal and wherein the motor stops when the second connecting terminal begins to physically disengage from the body but prior to the first battery terminal detaching completely from the body, thereby preventing an arc from being generated between the first battery terminal and the body.

* * * * *